United States Patent
Kenney

[15] 3,638,159
[45] Jan. 25, 1972

[54] DECLINING RESISTANCE RESISTOR
[72] Inventor: David A. Kenney, Palos Verdes Estates, Calif.
[73] Assignee: Northrop Corporation, Beverly Hills, Calif.
[22] Filed: Nov. 24, 1969
[21] Appl. No.: 879,205

[52] U.S. Cl. ............................................................338/20
[51] Int. Cl. ...........................................................H01c 7/10
[58] Field of Search ..........................338/20; 252/506, 514

[56] References Cited

UNITED STATES PATENTS

| | | | |
|---|---|---|---|
| 3,490,440 | 1/1970 | Mosier et al. | 252/514 X |
| 2,654,945 | 10/1953 | Richardson et al. | 252/514 X |
| 2,486,341 | 10/1949 | Stumbock | 252/514 X |

*Primary Examiner*—Rodney D. Bennett, Jr.
*Assistant Examiner*—R. Kinberg
*Attorney*—Sokolski & Wohlgemuth and W. M. Graham

[57] ABSTRACT

A solid-state timer device which is comprised of a housing containing a mixture of either a powdered photosensitive metal salt or oxide with an inert conductor. Electrical leads are in contact with the mixture so as to pass a current therethrough. The electrical resistance of the mixture linearly declines with elapsed time at a fixed DC voltage input.

13 Claims, No Drawings

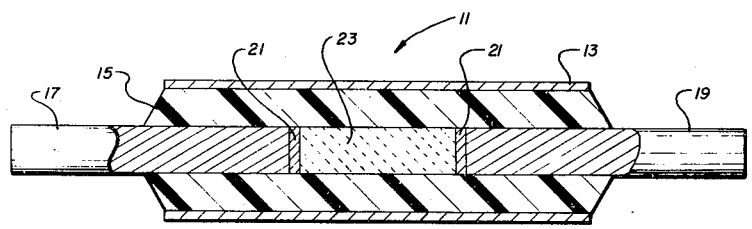

PATENTED JAN 25 1972
3,638,159
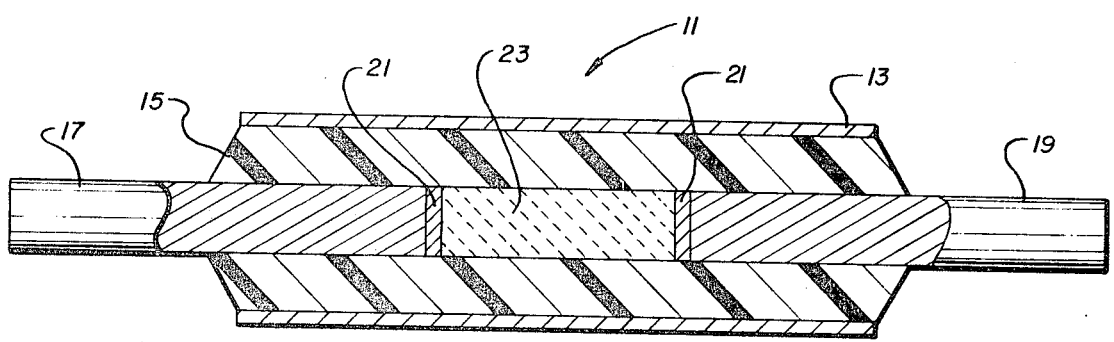
INVENTOR.
DAVID A. KENNEY
BY
SOKOLSKI & WOHLGEMUTH
ATTORNEYS

DECLINING RESISTANCE RESISTOR

Timing devices having no moving parts are becoming increasingly important. Uses for such timer devices include equipment time recorders to indicate the total time that the component has been operated. In conjunction with a simple circuit a timer of the type of this invention could be used to activate or deactivate a circuit or piece of equipment after a specific time. Additionally, such devices could be used as compensators in instances where the output of an electrical device is known to diminish at a specific rate with usage. A timer device could then be used to control a compensating circuit to step up electrical input at an equal rate, thus resulting in a constant output.

The most prevalent form of timer available involves an electrochemical cell. Utilizing Farraday's law, these prior timers generally deplate a given amount of silver from an anode through electrolyte solution onto a cathode surface. The timer serves to activate associated equipment when the deplating has been completed and the resistance greatly decreases at that point. As a result, the amount of silver initially disposed on the anode must be carefully controlled so that repeatable results can be obtained from timer to timer as the amount of silver determines the time period for the deplating at given current input.

The aforegoing cells have a disadvantage in that they contain a liquid electrolyte which can leak and is often temperature and pressure sensitive. Further, the plating process must, as indicated, be completed to determine the total time. If one wishes to simply measure time prior to the complete deplating, then the cell must be removed from the circuit in which it is used and expensive laboratory equipment is required to determine the amount of silver that has been deplated and correlate this to time elapsed. If it is desired to reuse such an electrochemical cell then the current must be reversed and the silver deplated must be replated onto the anode. This requires, of course, either removing the cell from the circuit in which it is used or alternatively changing the leads to the cell, both of which are not generally practicable.

Thus, an object of this invention is to provide a solid-state electric timing device.

Another object of this invention is to provide a solid-state electronic timing device that can readily measure elapsed time.

A further object of this invention is to provide a solid-state electric timing device which can operate at extremely low current and voltages.

Still a further object of this invention is to provide a solid-state timer which is simple and inexpensive.

The above and other objects of this invention are accomplished by a novel electric timing device which comprises a housing which is either of a nonconductive material or a normally conductive composition which is then insulated from the separate terminals and material contained therein. In one embodiment, the housing can comprise one of the terminals. Within the housing is disposed a powdered mixture of a photosensitive metal salt or oxide, with an inert conductor, such as graphite. In contact with the material within the housing are two terminals whereby leads from an electronic circuit can be attached to the device so that current will flow through the powdered mixture. As electric current flows between the terminals the resistance of the device linearly decreases with elapsed time. By simply placing an ohmmeter across the terminals one can determine the decrease in resistance of the element and thus determine the elapsed time. In some embodiments of the invention, the device will substantially remain at the decreased resistance level after the current flowing therethrough is stopped. In other embodiments of the invention, the deice will return to a predetermined or original level of resistance when current has stopped, and is thus ready for use once again. It is believed that the invention will be better understood from the following detailed description and drawing in which:

The FIGURE is a cross-sectional view of a device of this invention.

It is believed that the operability of the invention is based on the reduction of metallic salt or oxide particles to the metallic ions such as occurs in the photolysis action commonly used in photographic reproduction. In the instant invention it is believed that this reduction is achieved through the use of electric current rather that by light photons. For example, silver halides have a much greater electrical resistance than metallic silver. Thus, the conductivity of a mixture containing silver halide particles will increase as the salt is reduced to metallic silver during the flow of current through the device.

It is believed that the inert conductive material such as graphite in the mixture of the invention absorbs the gaseous ions liberated during the reduction of the salt, thus preventing recombination of the gaseous ions with the resulting metallic ions.

Thus, it has been found that the amount of inert conductive material present in the powdered mixture will affect the tendency of the device to return or retrogress toward the original resistance level after current flow is stopped. Thus, the more inert conductive powder present to absorb or tie up liberated gaseous ions, the less will be the tendency for the device to retrogress. Further, it has been discovered, as will be explained in further detail, that some materials tend to retrogress more readily than others. For example, zinc oxide has a greater retrogression than the metal halides.

It has been observed for many compositions explored, that when the device does possess a retrogression ability, the first time the device is exercised over its maximum operating range, the initial resistance will drop to a new value. Thereafter, it will return to this new value shortly after stoppage of current flowing through the device.

Surprisingly, it has been discovered that the degree of compaction of the powdered mixture does not affect the retrogression characteristics of the device. The degree of compaction mainly bears upon the initial resistance level. The greater the compaction, the lower the initial resistance. Satisfactory performance has been demonstrated with mixtures compacted as low as 3,000 p.s.i. The degree of compaction can range up to the point where no further compaction of the powder occurs. With various tested compositions the upper composition pressure was about 10,000 p.s.i.

The metal salts or oxides used are in a powder form. It has been found that the size of the powder particles does not have a significant effect upon the operation of the device of the invention. Typical particle sizes have ranged from 50 to 200 microns. Better packing and dispersal is achieved at the smaller particle sizes.

The preferred metal salts are the metal halides. Of the halides, the most preferred is the class of silver halides, particularly silver chloride, silver bromide and silver iodide. In addition to silver halides, the results of this invention have also been observed utilizing other photosensitive halides such as the copper halides, including both cuprous and cupric forms. Additional metal salts such as the oxalates including ferric oxalate are contemplated as suitable normally photosensitive materials. Zinc oxide, which is also photosensitive, has been found to be a suitable material to be combined with the inert conductive powder.

The normally photosensitive metal salts or oxides are combined with an inert conductive powder of about the same particle size range. The conductive powder must obviously be comprised of a material which conducts electricity yet will not react with the metal salt or oxide and thus is inert thereto. A most preferred material is graphite. Additionally, various compatible metal powders such as silver, silver oxide, and copper powders can be used.

As indicated, the mixture of powders can be merely compacted within the device of the invention. Alternatively, a small amount of an inert resinous binder such as an epoxy polymer or the like can be used. The binder will provide a solid element for the device when the resin is cured. In such an embodiment, the binder cannot be present in an amount sufficient to interfere with the conductivity of the powder mixture.

Thus, a very small amount of the binder is used sufficient to hold the powders together in a solid state yet not interfere with the electrical properties.

Turning to the FIGURE, there is seen a typical device made in accord with this invention. The device 11 comprises an outer housing 13 which can, for example, be a tube of stainless steel or the like. So that the outer protective tube 11 is suitably insulated, a liner 15 of a resin material such as an epoxy or the like can be utilized and can be bonded to the housing 13. Two terminals which are in the form of steel rods 17 and 19 are concentrically disposed within each end of the cylindrical housing 13. Each inward end of the rods of terminals 17 and 19 preferably have a silver tinned facing 21 which serves to improve the conductivity. Between the two silver tinned faces 21 of the rods is disposed a powdered mixture 23, having a composition as has been previously described.

In this particular embodiment of the invention, the powder mixture 23 can be compressed in situ within the tubular housing 13 by exerting pressure on either one or both of the rods or terminals 17 and 19, whereby they will serve as compression pistons. The rods are held in contact with the mixture by application of epoxy between the rods and the housing. Alternatively of course, the powder mixture 23 can be compacted to a desired degree and formed within a die press, or be mixed with a binding agent and molded as a pellet. The electrical leads can also be attached by embedding the ends of leads, enlarged to provide secure attachment and greater conducting area, during the compacting or molding process. This assembly can then be encapsulated in a plastic housing, similar to standard construction techniques used for electrical resistors.

As has been indicated, the retrogression or return of the timing device of this invention to its initial resistance value upon the stoppage of flow of current is dependent upon the proportion of inert conductive material, such as graphite, present in the powdered mixture. The amount of conductive material that can be present can vary over a fairly wide range on a weight basis. However, since the photosensitive powders have widely differing molecular weights, the ratios depend upon the given material chosen.

If the device is too rich in the inert conductive material, the metallic salt particles will not experience sufficient electrical potential to react so that a decline in resistance will be experienced. On the other hand, the herein device will have a very severe drop in resistance if no inert conductive material is present. The photosensitive powders are not very conductive, if at all. Thus, a maximum potential drop is experienced when no conductive material is present. This, of course, causes a rapid reaction and decline in resistance. From a practical standpoint, the herein device should require at least 0.10-milliamp current to operate it. Thus, there must be sufficient inert conductive material present to require the aforegoing current. It has been found that the device will operate most successfully over a range of 1 to 5 milliamps, indicating the relatively low current levels required. The more conductive material present, the more current will be required. Thus, one could have enough conductive material to require 10 milliamps current. As a result, the upper limit for the amount of conductive material is the point where no decline in resistance is experienced when the device is subjected to current. Thus, for example, with the silver halides, the weight ratio of the halide to graphite which gives the best results varies from 12:1 to 24:1. For a copper halide, best results are obtained with the weight ratio of halide to graphite of from 8:1 to 12:1, and for zinc oxide the ratio of oxide to graphite, from 4:1 to 8:1. Since there are only two ingredients, it is a simple trial and error type of approach to determine the most desirable ratio of ingredients for given materials and desired end results.

The rate at which the resistance will decline across the compacted powdered material 23 of the device of this invention is related closely to the surface area of leads exposed to the material. For example, if the rods 17 and 19 have a ⅛-inch diameter, the interface between the rods and the material 23 will also, of course, be one-eighth inch diameter in the embodiment shown. Such a device having a ⅛-inch diameter at the interface will have a rate of resistance decline substantially less than one that would have a diameter of three-sixteenths inch. A 3/16-inch diameter, for example, is equivalent to an increase in area of 225 percent.

For the aforegoing reason, it is not preferred, in instances where the characteristics of large area devices are important, to embed the leads directly into the powder. The effective surface area for the current path traversing between the two leads would be greatly diminished from that shown in the FIGURE where the entire end of each lead contacts the equivalent end of the compacted powder material 23. It should be pointed out that the surface area of contact or effective surface area for the current path to flow between the electrodes, does not affect the linearity of the decline in resistance over a given time period. The surface area merely affects the rapidity of such a decline. In some instances it might be desirable to minimize the surface area contact so as to greatly slow down the decline in resistance. It should be noted that one of the advantages of the instant device is its ability to function at low currents of less than 1 milliamp and low voltages.

In addition to the embodiment shown, if one wanted to maximize the surface area contact while not unduly enlarging the leads 17 and 19 per se, one could use enlarged conductive portions made out of material such as graphite and the like that could be affixed to the ends of each lead in contact with an enlarged center section 23.

Additionally, one could make the container for the powdered material, one electrode having a very large surface area. The other electrode would comprise a center pin concentrically disposed in the container and insulated therefrom.

The retrogression characteristic of some of the embodiments of this invention can be important in certain end uses. However, in many applications it will make no difference whether or not the active material used in the timer device retrogresses or not, since one will not be concerned with what occurs after current stops flowing through the device. Where the timer device serves to actuate the mechanism after a certain time period, retrogression of the timer is of no moment as far as its performing that function. However, if the timer is removed after it has served the timing function and allowed to reset itself by retrogression to its original or some other higher resistance value, it then becomes a reusable item. In other applications where the timer serves to measure a continuous elapsed running time, retrogression is again of no particular moment. An ohmmeter or like instrument would merely be connected across the device and readings obtained at specified intervals to determine the resistance level and correlate this to the elapsed time. Thus, retrogression is most useful where it is desired to reuse a time that has performed a given function. Alternatively the ability to provide a timer device that does not retrogress or will maintain a fixed resistance level after operation is valuable in that once its timing function has stopped, one can always measure the elapsed time that it had run by the resistance level at that point. It is pointed out that the device of the invention will in many instances retrogress a particular percentage after each run. For example, a device might retrogress 10 percent from the resistance value reached. Thus, once this percentage is known, one can calibrate that device or type of device taking into account the retrogression. Thus, though a device will retrogress, if such is always constant, the device can be operated as one that does not retrogress at all. It is believed that the invention will be further understood from the following detailed examples.

EXAMPLE I

A device as shown in the FIGURE was used to perform the tests of this example. The inside diameter or diameter of the active powder material was one-eighth inch, which was also the diameter of the two leads. A mixture of silver bromide and graphite was used wherein the weight ratio of the bromide to graphite was 20:1. 0.32 grams of the mixture was placed in the device and the leads forced together serving to compress the powder mixture to the point where no further lowering in resistance occurred. In this example this was approximately 10,000 p.s.i. In order to determine the maximum pressure, periodic resistance measurements were made using an ohmmeter and directing the current through the timer formed.

EXAMPLE II

The same mixture of powder as set forth in example I was used. However, only 30 percent of the quantity of powder used in example I was placed in the timer specimen housing to be tested. The powder was compressed in the manner described in example I to approximately the same initial resistance level as the sample in example I. This was about 2,000 ohms. The required pressure to achieve this was approximately one-third that used in example I. The reason for this is that the greater the quantity of powder between the leads or electrodes, the greater the initial resistance of the device. Additionally, the initial resistance level of the device is affected by the degree of compaction of the powder with the greater the compaction, the greater the initial resistance. Since only one-third the amount of powder was used, approximately only one-third of the pressure is needed to achieve the same initial resistance level as the greater quantity of powder compressed to a greater degree, set forth in example I. As will eventually be shown in the table, there was no significant change in performance or retrogression between the specimen of example I and that set forth in this example. Additionally, it will be seen that the fully compressed specimen was slightly more responsive and retrogressive than the partially compressed one of this example.

EXAMPLE III

The same powdered mixture of example I was used. The weight of the powder was 0.72 grams or 225 percent more than the 0.32 grams of example I. However, in this example, the cross-sectional area of the compressed powder, together with the pins, was 225 percent larger than that in example I. This resulted from the pins having a diameter of three-sixteenths inch, which was also the inside diameter of the device. The powder was compressed to approximately 2,000 ohms, which was the same level of initial resistance of the device in example I. In order that the length of path through the powder between the electrodes remained the same as example I, 0.72 grams of powder was used. It will be seen that the percentage of decline per unit of time for this specimen with a large area was approximately twice that of the smaller area specimen in example I. It is believed that this is due to there being approximately twice as many possible conductive paths through the material. Retrogression characteristics were about the same as the device of example I.

EXAMPLE IV

A plurality of devices having the same dimension of and utilizing the same amount of powder were formed. These devices contained different halide salts. These included a silver chloride-graphite device having a ratio of chloride to graphite of 20:1; silver iodide-graphite, 18:1 ratio; cuprous chloride-graphite having an 20:1 weight ratio, and a cupric chloride-graphite specimen having a ratio of 20:1.

EXAMPLE V

A zinc oxide and graphite specimen was made wherein the ratio of zinc oxide to graphite was 8:1. Activated charcoal, which has much greater absorptive properties than graphite, was used in an attempt to reduce the degree of retrogression associated with zinc oxide. The size and compression conditions were essentially the same as example I.

All of the specimens made in the foregoing examples were tested at ambient temperature at approximately 5 volts DC. There were no current-limiting resistors used during the test. Resistances were measured the first half hour, the first hour, and every hour on the hour thereafter for 8 hours, or until the specimen dropped below 50 percent of its initial value, at which time it was disconnected. Resistances were again measured 16 hours after specimens were disconnected to determine retrogression characteristics. The following table summarizes the results of the tests by indicating the initial resistance, resistance at the end of the test, and again at the end of 16 hours to show retrogression.

TABLE

| Specimen | Composition | Approx. p.s.i. compressed | Initial res., ohms | End of test res., ohms | After 16 hrs. | Percent drop end test | Percent drop final | Final drop test drop |
|---|---|---|---|---|---|---|---|---|
| AgBr-Ex. I | Silver bromide and graphite (20:1) | 10,000 | 2,265 | 966 | 1,632 | 57.3 | 28.0 | .49 |
| AgBr-Ex. II | do | 10,000 | 1,893 | 680 | 1,343 | 64.0 | 29.1 | .53 |
| AgBr-Ex. III | do | 3,000 | 2,072 | 1,132 | 1,630 | 45.4 | 21.4 | .47 |
| AgCl-G | Silver chloride and graphite (20:1) | 10,000 | 1,903 | 910 | 1,576 | 52.2 | 17.2 | .33 |
| AgI-G | Silver iodide and graphite (18:1) | 10,000 | 2,274 | 952 | 1,571 | 58.1 | 31.0 | .53 |
| CuCl-G | Cuprous chloride and graphite (20:1) | 10,000 | 1,469 | 1,399 | 1,393 | 4.8 | 5.2 | 1.08 |
| CuCl$_2$-G | Cupric chloride and graphite (20:1) | 10,000 | 1,387 | 992 | 1,053 | 28.5 | 24.1 | .85 |
| ZnO-G | Zinc oxide and graphite (8:1) | 10,000 | 2,194 | 1,794 | 2,122 | 18.2 | 3.3 | .18 |

It is to be noted that the silver chloride and graphite mixture actually performed about the same as the silver bromide and graphite one, since there was no adjustment for the difference in the halide salts as to the ratio of the halide to the graphite between the two. The silver iodide specimen was extremely responsive due to the lean mixture of graphite to silver iodide, yet the retrogression characteristics were about the same as the silver bromide example. The cuprous chloride specimen decline from approximately 2,000 to 1,469 ohms prior to testing, without application of any current. However, a very small decline in resistance occurred during the test. This decline continued, but to a much lesser degree, after the specimen was disconnected. Likewise, the cupric chloride specimen declined from approximately 2,000 to 1,387 ohms prior to testing without application of current. The percentage of decline during the test was about half that of the silver bromide specimen of example I, which could be due to the cupric chloride device being relatively rich in graphite. Retrogression, as can be seen, was relatively small. The zinc oxide nearly returned to its initial resistance after the 16 hours had elapsed from the end of the test. Thus, for repeatable applications, zinc oxide will be the most desirable material to be used with the graphite.

I claim:

1. A timer device comprising:
   a housing,
   a powder mixture disposed in said housing of a normally photosensitive material selected from the group consisting of metal salts and metal oxides together with an inert conductive material, the ratio of ingredients being sufficient to provide a decrease in electrical resistance when a current is passed therethrough,
   and at least two electrically conductive terminals in contact with and separated by said powder mixture.

2. The device of claim 1 wherein said inert conductive material is selected from the group consisting of silver, silver oxide, graphite and copper.

3. The device of claim 1 wherein said metal salts are selected from the group consisting of silver halides, copper halides and metal oxalates.

4. The device of claim 1 wherein said metal oxide is zinc oxide.

5. The device of claim 1 wherein the metal salt is a silver halide and the inert conductive material is graphite.

6. The device of claim 5 wherein the weight ratio of silver halide to graphite can vary from 12:1 to 24:1.

7. The device of claim 1 wherein the metal salt is a copper halide and the inert conductive material is graphite.

8. The device of claim 7 wherein the weight ratio of copper halide to graphite can vary from 8:1 to 12:1.

9. The device of claim 1 wherein the metal oxide is zinc oxide and the inert conductive material is graphite.

10. The device of claim 9 wherein the weight ratio of zinc oxide to graphite can vary from 4:1 to 8:1.

11. The device of claim 1 wherein said powder mixture is pressed to a compact mass.

12. The device of claim 1 wherein said powder mixture is disposed in an inert solid binder.

13. The device of claim 1 wherein the mixture contains sufficient inert conductive material to require at least 0.10 milliamp of current to operate said device.

* * * * *